(12) United States Patent
Vandendorpe et al.

(10) Patent No.: US 12,285,062 B2
(45) Date of Patent: Apr. 29, 2025

(54) AIR DELIVERY SYSTEM HAVING DUAL CONFIGURATION AIR FILTRATION ASSEMBLY

(71) Applicant: Est Optimum Sui LLC, Naperville, IL (US)

(72) Inventors: James E. Vandendorpe, Naperville, IL (US); David L Vandendorpe, Athens, OH (US)

(73) Assignee: EST OPTIMUM SUI LLC, Naperville, IL (US)

( * ) Notice: Subject to any disclaimer, the term of this patent is extended or adjusted under 35 U.S.C. 154(b) by 653 days.

(21) Appl. No.: 17/659,247

(22) Filed: Apr. 14, 2022

(65) Prior Publication Data

US 2022/0330630 A1 Oct. 20, 2022

Related U.S. Application Data

(60) Provisional application No. 63/201,188, filed on Apr. 16, 2021.

(51) Int. Cl.
*A41D 13/11* (2006.01)
*A41D 27/28* (2006.01)
(Continued)

(52) U.S. Cl.
CPC ...... *A41D 13/1184* (2013.01); *A41D 13/1161* (2013.01); *A41D 27/28* (2013.01);
(Continued)

(58) Field of Classification Search
CPC .. A41D 13/11–1192; A62B 18/00–088; A62B 17/00; A62B 17/005–04;
(Continued)

(56) References Cited

U.S. PATENT DOCUMENTS 3,822,698 A 7/1974 Guy
5,054,479 A 10/1991 Yelland et al.
(Continued)

FOREIGN PATENT DOCUMENTS

IN 203935530 U 11/2014
JP 3227751 U 9/2020

OTHER PUBLICATIONS

E. Hossain et al., "Recharging and rejuvenation of decontaminated N95 masks," Phys. Fluids 32, 093304 (2020), 8 pages.
(Continued)

*Primary Examiner* — Rachel T Sippel
(74) *Attorney, Agent, or Firm* — Jordan IP Law, LLC

(57) ABSTRACT

An air delivery system includes a visor having an outer peripheral edge and an inner peripheral edge. An air filtration assembly is removably mounted above an opening in the visor between the outer and inner peripheral edges, the air filtration assembly comprising a fan having an air inlet and an air outlet, an anode layer disposed over the air inlet, a filter layer disposed over the anode layer and a cathode layer disposed over the filter layer. In a first configuration, the air filtration assembly provides air flow toward an inner surface of the visor and, in a second configuration, the air filtration assembly provides air flow away from an outer surface of the visor. The air filtration assembly includes a mode actuator configured to control operation of a filtration mode indicator in dependence upon positioning of the air filtration assembly in the first or second configuration.

20 Claims, 7 Drawing Sheets

(51) Int. Cl.
*A62B 18/00* (2006.01)
*A62B 23/02* (2006.01)
*B01D 39/16* (2006.01)
*B01D 46/00* (2022.01)

(52) U.S. Cl.
CPC .......... *A62B 18/003* (2013.01); *A62B 18/006* (2013.01); *A62B 23/02* (2013.01); *B01D 39/1623* (2013.01); *B01D 46/0032* (2013.01); *B01D 2239/0618* (2013.01)

(58) Field of Classification Search
CPC ... A62B 23/00–025; A62B 7/10; A62B 9/006; A62B 9/04; A42B 3/28–286; B01D 46/0032; B01D 39/1623; B01D 2239/0618
See application file for complete search history.

(56) References Cited

U.S. PATENT DOCUMENTS

| | | | |
|---|---|---|---|
| 5,401,446 A | 3/1995 | Tsai et al. | |
| 5,878,742 A | 3/1999 | Figueredo et al. | |
| 6,481,019 B2 | 11/2002 | Diaz et al. | |
| 7,357,135 B2* | 4/2008 | Cunningham | A62B 17/04 128/201.29 |
| 12,172,040 B2* | 12/2024 | Cohen | A61L 9/20 |
| 2009/0010801 A1* | 1/2009 | Murphy | B01D 46/10 422/4 |
| 2022/0211897 A1* | 7/2022 | Wills, Jr. | B01D 53/007 |
| 2022/0331815 A1* | 10/2022 | Hepperle | B01D 46/0032 |
| 2022/0379319 A1* | 12/2022 | Lee | B03C 3/45 |
| 2023/0364544 A1* | 11/2023 | Seegers | B01D 53/323 |

OTHER PUBLICATIONS

M. Scudellari, "N95 Masks' Efficiency Can Be Restored With Electricity: Smart Masks May Follow," Sep. 14, 2020, IEEE Spectrum, Retrieved from the Internet: URL:https://https://spectrum.ieee.org/one-day-medical-workers-might-plug-in-their-smart-masks. 17 pages.

"Innokin Filter Fan Cap, Face Shield Hat with Built-In Dual Fans for 3-6 hrs of Cool Air + Free Breathe 2000mAh Recharge via Micro-USB, 5× 3-PLY Filters, Soft Curtain Clear Faceshield, Green Leaf," Jan. 7, 2021, Retrieved from the Internet: URL:https://https://www.amazon.com/Innokin-Breathe-Recharge-Micro-USB-Faceshield/dp/B08CKY3YYM. 7 pages.

* cited by examiner

AIR DELIVERY SYSTEM HAVING DUAL CONFIGURATION AIR FILTRATION ASSEMBLY

FIELD

The present disclosure generally concerns air delivery systems and, in particular, an air delivery system comprising an air filtration assembly capable of dual configurations.

BACKGROUND

The recent proliferation of various airborne pathogens, such as SAR-CoV-2 virus, has lead to new appreciation for the availability of personal protective equipment (PPE) that is capable of reducing a user's exposure to such pathogens. For example so-called N95 mask are known as being capable of filtering out certain pathogens, including the SAR-CoV-2 virus. Such masks are fabricated from an electrostatically charged web of non-woven material such as polypropylene or other suitable non-conductive polymers as described in U.S. Pat. No. 5,401,446, the teachings of which are incorporated herein by this reference.

While such masks have proven effective, they suffer from various drawbacks. In particular, they must be worn with a very close facial fit in order to properly filter the air being respirated by the mask's user, both for the benefit of the user (i.e., to filter air breathed in by the user) and those in proximity to the user (i.e., to filter air breathed out by the user). Such a close facial fit is typically achieved through the use of elastic straps passing behind the ears of the user and biasing the mask into contact with the user's face. However, when worn for extended periods of time, such masks accumulate exhaled breath, which is a danger to some users, and over time these masks become increasingly uncomfortable, sometimes leading to ineffective filtration when the user adjusts the fit of the mask for purposes of comfort. Furthermore, masks that closely and continuously cover the user's mouth and nose require the user to repeatedly remove and replace the mask when eating or drinking, which can be inconvenient and also increase the likelihood that such repositioning will ultimately result in ineffective placement of the mask.

Other types of masks are known, such as so-called face shields in which a user's entire face is protected by barrier or screen made of a sheet of (typically transparent) material such as a flexible polymer or the like supported by a visor or helmet worn by the user. Such face shields are known to come in either passive or active configurations. In a passive configuration, the face shield simply acts to block the environment outside of the screen but does not otherwise provide any filtration of air respirated by the user. In an active configuration, additional mechanisms are incorporated into the face shield to filter and/or pressurize air breathed in by the user. For example, U.S. Pat. Nos. 3,822, 698; 5,054,479; 5,878,742 and 6,481,019 provide various forms of face shields in which filtered and pressurized air is provided to the region between the user's face and the barrier or screen in front of the user's face. While such face shields may be helpful in protecting user's from airborne pathogens, they tend to be bulky, and thus uncomfortable for the wearer, and/or fairly complex in their construction thus making them cost prohibitive for use by large number of everyday users. Further still, such face shields are focused on the protection of the user in that they typically provide filtration only of the air supplied to the wearer, but make no provision for filtration of air breathed out by the wearer.

Thus, air delivery systems that overcome the above-noted shortcomings would be a welcome advancement of the art.

SUMMARY

The above-noted shortcomings are addressed by an air delivery system in accordance with the instant disclosure. In particular, an air delivery system comprises a visor having an outer peripheral edge and an inner peripheral edge configured to conform to and be positioned across a forehead of a user. An air filtration assembly is removably mounted above an opening in the visor between the outer and inner peripheral edges, the air filtration assembly comprising a fan having an air inlet and an air outlet, an anode layer disposed over the air inlet, a filter layer disposed over the anode layer and a cathode layer disposed over the filter layer. Thus configured, air enters the air filtration assembly through the cathode layer and exits the air filtration assembly through the air outlet. A filtration mode indicator is also supported by the visor. In a first configuration, the air filtration assembly provides air flow toward an inner surface of the visor and, in a second configuration, the air filtration assembly provides air flow away from an outer surface of the visor. The air filtration assembly includes a mode actuator configured to control operation of the filtration mode indicator in dependence upon positioning of the air filtration assembly in the first or second configuration.

In an embodiment, the anode layer and cathode layers each comprise a conductive mesh sized to cover the air inlet. Further, the cathode layer may comprise an opening in the conductive mesh larger than mesh openings of the conductive mesh and smaller than the air inlet. In a presently preferred embodiment, the filter layer comprises an electrostatic non-woven polypropylene fiber material. Further, the air filtration assembly preferably comprises a sealing layer between the filter layer and the cathode layer, which sealing layer is configured to provide a gap of approximately 1/16th of an inch (1.6 mm) between the anode and cathode layers.

In an embodiment, the air delivery system includes a preferably transparent barrier or screen positioned along the outer peripheral edge of the visor and extending substantially perpendicular to the visor. Preferably, the barrier is vertically configurable such that a distal edge of the barrier relative to the visor may be extended past a chin of the user or retracted into proximity with the visor. In an embodiment, barrier slide assemblies are provided and configured to retain the barrier in proximity to the outer peripheral edge of the visor and to permit vertical configuration of the barrier. To this end, each of the barrier slide assemblies defines a slot configured to receive a lateral edge of the barrier. Additionally, a barrier support is preferably provided, which barrier support extends along the outer peripheral edge of the visor, where a biasing element biases the barrier into contact with the barrier support and bias the lateral edges of the barrier into the slots of the barrier slide assemblies.

In another embodiment, the air delivery system comprises a headband operatively connected to the visor and configured to fit around a head of the user.

In another embodiment, the air delivery system comprises a power assembly operatively connected to and electrically biasing the anode layer and the cathode layer. In this embodiment, the filtration mode indicator comprises a visual indicator operatively connected to the power assembly by a mode switch configured to interact with the mode actuator. The mode switch is in an actuated state when the mode actuator interacts with the mode switch in the first configuration and in a default state when the mode actuator does not interact with the mode switch in the second configuration. In a presently preferred embodiment, the visual indicator comprise a bicolored light-emitting diode (LED). The power assembly may comprise at least one battery, such as one or more rechargeable batteries. In the case of rechargeable batteries, the power assembly may further include recharging circuitry operatively connected to the rechargeable batteries.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION OF THE PRESENT EMBODIMENTS

As used herein, phrases substantially similar to "at least one of A, B or C" are intended to be interpreted in the disjunctive, i.e., to require A or B or C or any combination thereof unless stated or implied by context otherwise. Further, phrases substantially similar to "at least one of A, B and C" are intended to be interpreted in the conjunctive, i.e., to require at least one of A, at least one of B and at least one of C unless stated or implied by context otherwise. Further still, the terms "approximately," "substantially" or similar words requiring subjective comparison are intended to mean "within manufacturing tolerances" unless stated or implied by context otherwise. Furthermore, dimensions illustrated in the accompany Figures are not necessarily to scale. Further still, any descriptions of direction, e.g., "left," "right," "upward," "downward," "front," "rear," etc. used herein is relative to drawings unless stated or implied by context otherwise.

Figure 1:
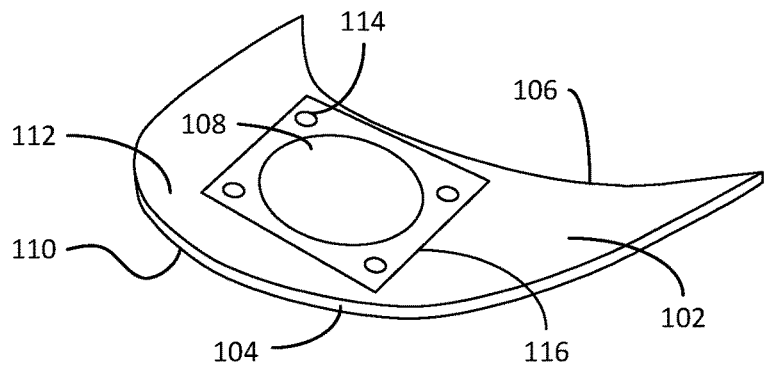
FIGS. 1-3 are perspective, schematic illustrations of an air delivery system in accordance with the instant disclosure in various stages of assembly.
Figure 2:
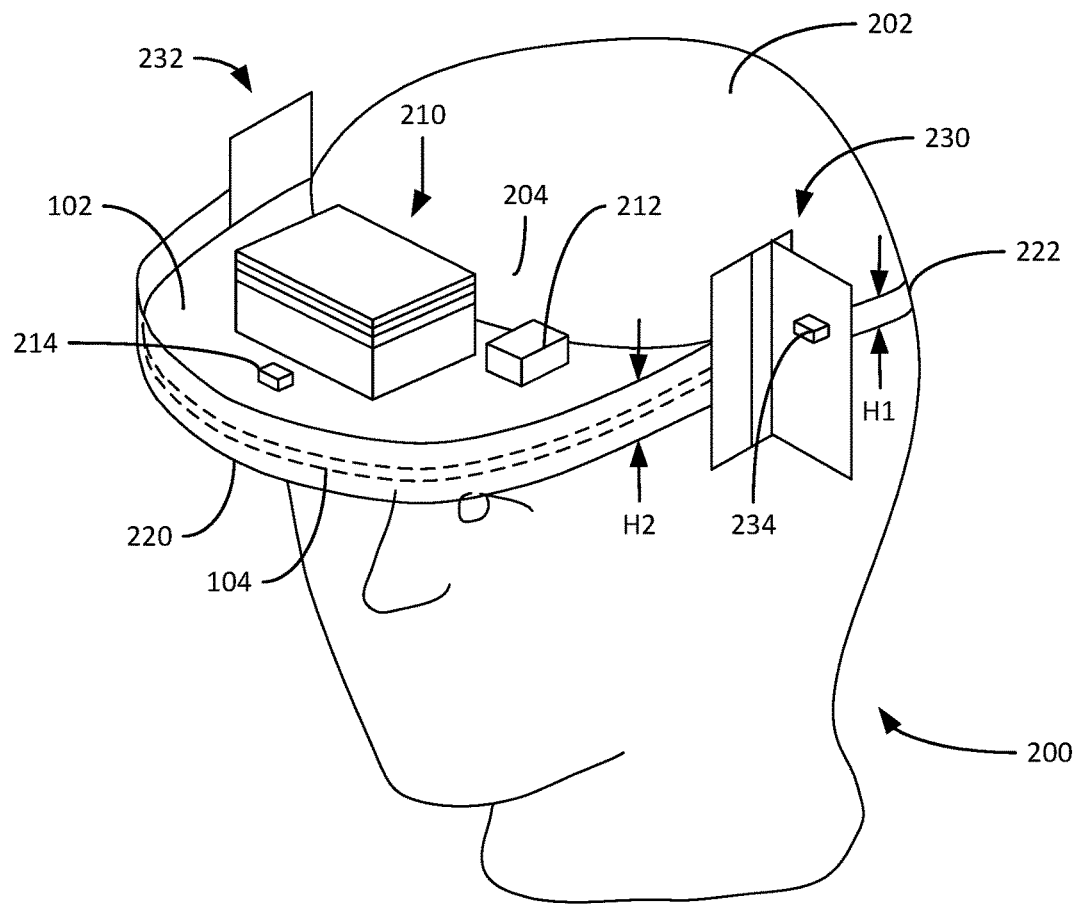
Figure 3:
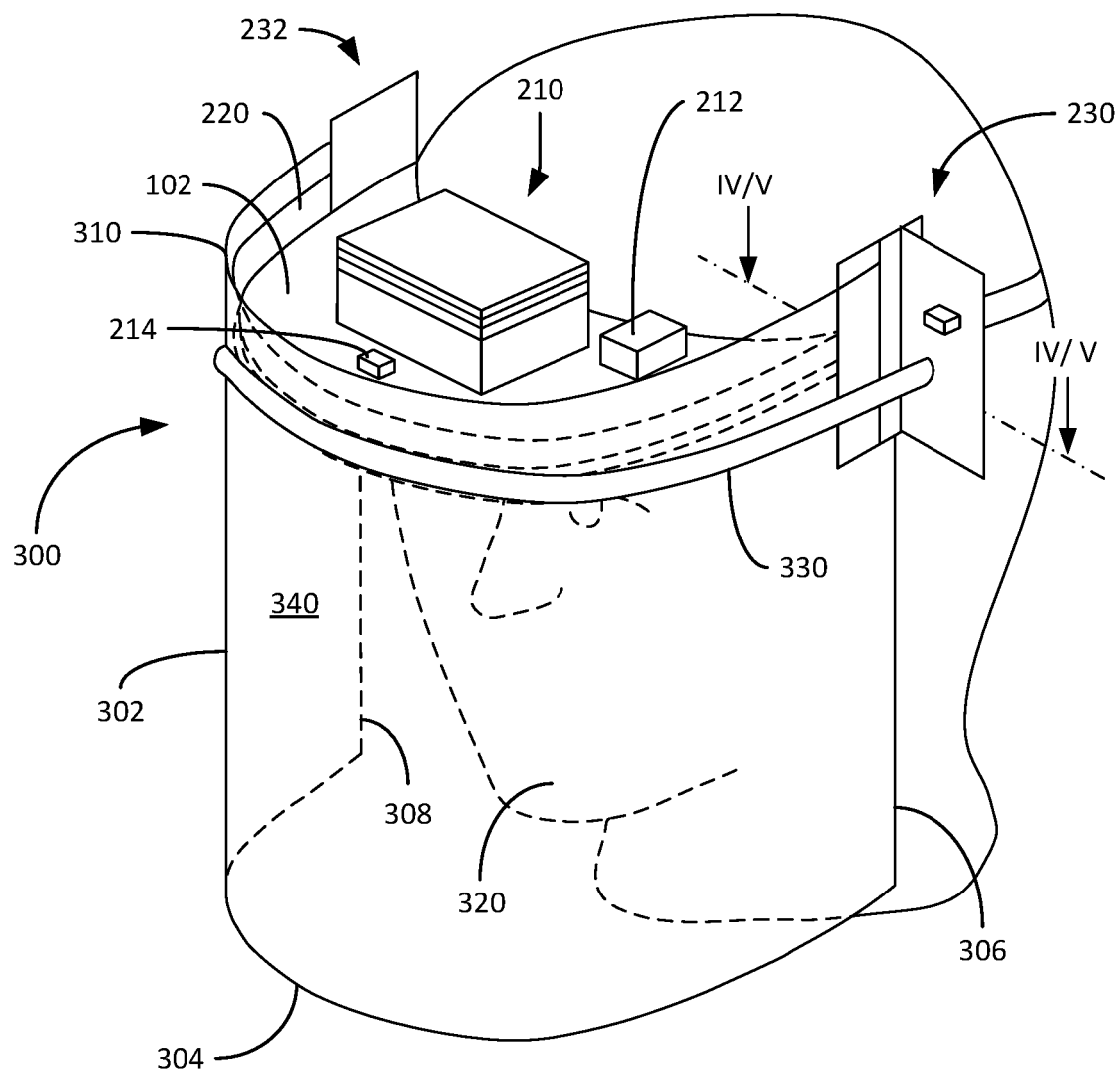

Referring now to FIGS. 1-3, an air delivery system 300 is illustrated in various stages of assembly. As shown in FIGS. 1-3, the base of the air delivery system 300 is a visor 102 having an outer peripheral edge 104, an inner peripheral edge 106, an inner/lower surface 110 and an outer/upper surface 112. In an embodiment, the visor 102 is substantially planar, though it is appreciated that the visor 102 could form a curved surface similar to a baseball hat or the like. In a presently preferred embodiment, the outer peripheral edge 104 is a curve extending between points where opposite sides of the visor 102 would meet the temples of a user's head 202 and extending away from the inner peripheral edge 106 that, in turn, is configured to conform to a forehead 204 of the user 200. In a further preferred embodiment, the minimum distance between the outer and inner peripheral edges 104, 106 (preferably aligned with the middle of the user's forehead 204) is 3.5 (89 mm), though this distance may vary as a matter of design choice. The visor 102 may be fabricated from any suitable material capable of supporting the various components, as described below in greater detail, such as a suitably thick polymer. Specific polymers or other materials suitable for fabricating the visor 102 will be evident to those having skill in the art. As further illustrated in FIG. 1, the visor 102 has an opening 108 formed therein thereby providing communication between the inner and outer surfaces 110, 112. The diameter of opening 108 is selected to ensure a sufficient air flow through the visor 102, either toward the inner surface 110 or the outer surface 112 as described in greater detail below. In a presently preferred embodiment, the opening 108 has a diameter of 2.25 inches (57.2 mm). A sealing gasket 116 is provided surrounding the opening 108. As shown, the sealing gasket 116 itself has an opening dimensioned to substantially match the opening 108 formed in the visor 102. Furthermore, an outer periphery of the sealing gasket 116 is configured to substantially match an outer periphery of an air filtration assembly as described in further detail below. Mounting holes 114 may also be provided in the visor 102 (FIG. 1) in order to mount the removable air filtration assembly 210 in either of two configurations as described in further detail below.

Referring to FIGS. 1, 2 and 3, further components of the air delivery system 300 are illustrated along with a user 200 of the system. In the illustrated embodiment, the visor 102 has an air filtration assembly 210 removably mounted on the outer surface 112 of the visor 102 and aligned with the opening 108. For example, suitable fasteners may be provided in conjunction with the air filtration assembly 210 to engage the mounting holes 114 formed in the visor 102. Other suitable attachment mechanisms for attaching the air filtration assembly 210, as described below, will be evident to those skilled in the art. As further shown in FIGS. 2 and 3, a power assembly 212 and/or a filtration mode indicator 214 may also be disposed on and supported by the visor 102. Additional details regarding the air filtration assembly 210, power assembly 212 and filtration mode indicator 214 and their relationships to each other are described below with reference to FIGS. 6-10.

A barrier support 220 and headband 222, each preferably fabricated from a flexible polymer or other suitable material, are also secured to the visor 102. As shown, the barrier support 220 is attached to the visor 102 (via suitable fasteners, adhesives, etc.) along the outer peripheral edge 104 of the visor 102 and preferably has a vertical dimension H2 greater than a thickness of the visor 102 at the outer peripheral edge 104. In particular, the vertical dimension H2 of the barrier support 220 is preferably large enough to prevent rotation of the barrier 302 relative to the user's face. In turn, the headband 222 extends rearwardly (i.e., toward the back of the user's head 202) away from the visor 102. In a preferred embodiment, the headband 222 is of sufficient length to extend around entirety of a user's head 202 and may include separate straps connected to the visor 102 at separate points aligning with a user's temples. In a presently preferred embodiment, a vertical dimension H1 of the headband 222 is less than the vertical dimension H2 of the barrier support 220. Further still, the headband 222 may include adjustment mechanisms (e.g., "VELCRO" fasteners, plastic snaps closures, etc. as known in the art) that permit a user 200 to adjust a length of the headband 222 as desired. In a presently preferred embodiment, the barrier support 220 and headband 222 form a continuous strip having separate regions defined by the respective vertical dimensions H1, H2.

As further shown in FIGS. 2 and 3, and according to a presently preferred embodiment, the air delivery system 300 comprises a barrier 302 and a pair of barrier slide assemblies 230, 232 mounted on the visor 102 in proximity to the points where opposite sides of the visor 102 would meet the temples of a user's head 202. The barrier 302 is preferably formed out of a thin, flexible sheet of transparent polymer such as a 0.02 inch (0.508 mm) thick clear polycarbonate having a width permitting the barrier 302 to extend along the length of the outer peripheral edge 104 of the visor 102 and, preferably, sufficient width to extend up to or past each temple of the user 200. Further still, a vertical dimension of the barrier 302 is such that a distal (relative to the visor 102) or lower edge 304 of the barrier 302 can extend past (lower than) the user's chin 320 while a proximal or upper edge 310 of the barrier 302 remains above visor 102 and barrier support 220, as shown in FIG. 3. In this manner, the barrier 302 forms a region 340 in between the barrier 302 and the user's face. As described in greater detail below with reference to FIGS. 4 and 5, each of the barrier slide assemblies 230, 232 is configured to receive a lateral edge 306, 308 of a barrier 302 and to permit the barrier 302 to slide up or down with the lateral edges 306, 308 still retained thereby. By sliding the barrier 302 up or down, a volume of space within the region 340 may be varied and, more particularly, access between the user's mouth and nose may be facilitated or prevented according to the user's desires.

Furthermore, each barrier slide assembly 230, 232 is configured to permit one or more biasing elements 330 (a single biasing element being shown in FIG. 3 for ease of illustration) to be fastened thereto. Each biasing element 330, which may comprise a suitable elastic cord such as bungee cord or the like, is preferably vertically aligned with the barrier support 220. Separate ends of the biasing elements 330 may be attached to respective ones of the barrier slide assemblies 230, 232 such that biasing element 330 is maintained in tension along the barrier support 220. The barrier 302, in addition to being supported by the barrier slide assemblies 230, 232, is placed between the barrier support 220 and the biasing element 330. The tension of the biasing element 330 urges it, and the intervening barrier 302, into continuous contact with barrier support and urges the lateral edges 306, 308 of the barrier 320 into engagement with the barrier slide assemblies 230, 232 while still permitting vertical displacement of the barrier 302 relative to the barrier slide assemblies 230, 232. To the extent that the barrier support 220 is maintained in a perpendicular (or within a desired angle away from perpendicular) configuration relative to the visor 102, the surface-on-surface contact between the barrier support 220 and the barrier 302 caused by the force of the biasing element 330 will likewise cause the barrier 302 to be similarly maintained in a perpendicular configuration relative to the visor 102.

In a presently preferred embodiment, the barrier slide assemblies 230, 232 may also be used to support other components of the air delivery system 300. For example, in the illustrated embodiment, a first barrier slide assembly 230 may be used to support a power switch 234 thereon. Still other components described herein, e.g., a recharging port 1014, may also be mounted on either of the barrier slide assemblies 230, 232 as a matter of design choice.

Figure 4:
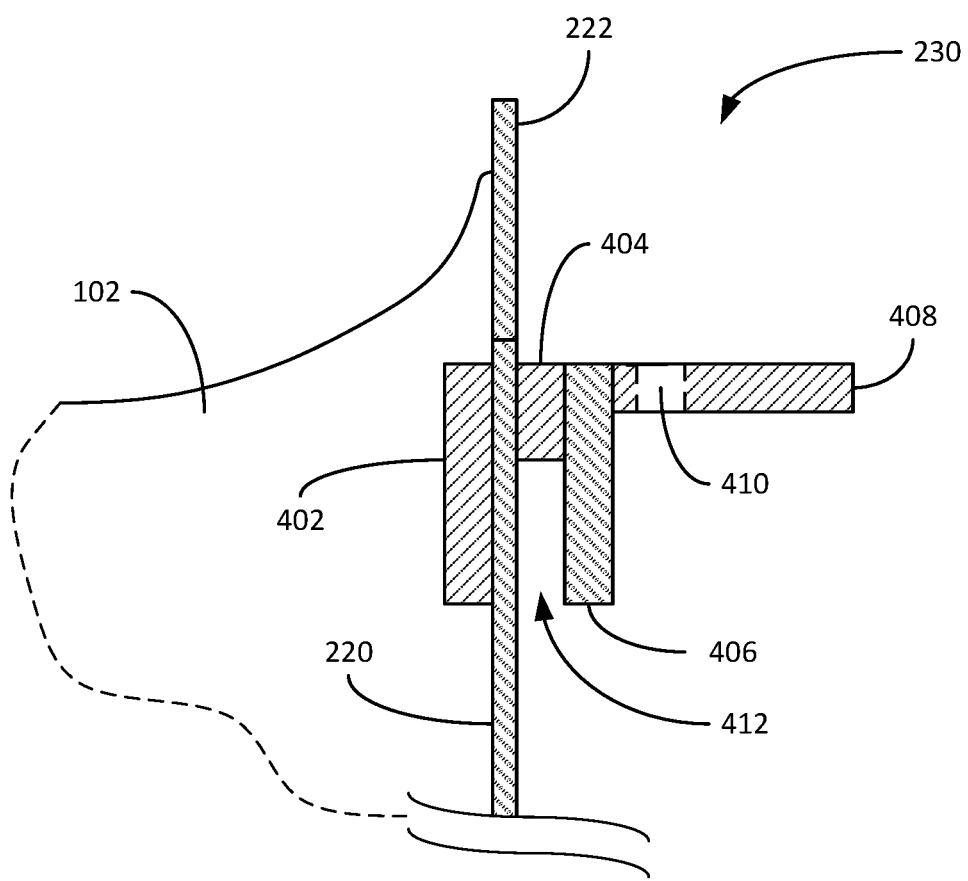
FIGS. 4 and 5 are top-down, cross-sectional illustrations taken along section line IV/V-IV/V of barrier slide assemblies in accordance with the instant disclosure.
Figure 5:
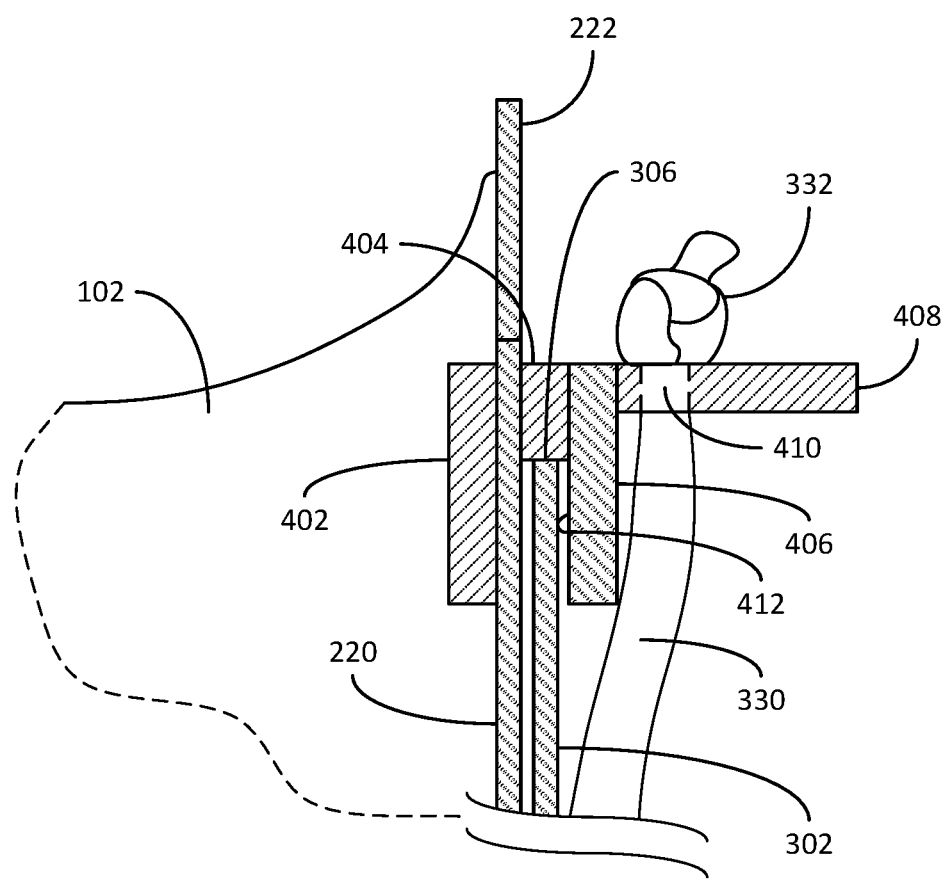

Referring now to FIGS. 4 and 5, top-down, cross-sectional views of the first barrier slide assembly 230 are shown. It will be appreciated that a similar cross-sectional view of the second barrier slide assembly 232 will be identical to those shown in FIGS. 4 and 5, albeit reflected about the vertical. The first barrier slide assembly comprises a first plate 402 mounted on the visor 102 using, for example, screws or dowels or the like. In a presently preferred embodiment, the first plate 402 comprises two half plates each vertically mounted (i.e., each abutting a respective one of and extending perpendicularly away from the inner and outer surfaces 110, 112) substantially flush with the outer peripheral edge 104 of the visor 102, thereby forming a substantially uniform, outward facing surface. In the illustrated embodiment, the continuous strip forming the barrier support 220 and headband 222 is adjacent to, and may be secured to, the outward facing surface of the first plate 402 (the rightmost surface of the first plate 402 as illustrated in FIGS. 4 and 5). In a similar manner, a second or spacer plate 404 is adjacent to the barrier support 220/headband 222, and a third plate 406 is disposed adjacent to the spacer plate 404. A fourth plate 408 is provided adjacent to and substantially perpendicular to the third plate 404 as shown. At least one opening 410 is provided in the fourth plate 408 to permit the attachment of the one or more biasing elements 330 as described previously. The vertical dimensions of the spacer, third and fourth plates 404, 406, 408 (i.e., extending into and out of the plane of FIG. 4) may be substantially equivalent to a vertical dimension of the first plate 402, though this is not a requirement. In a presently preferred embodiment, the sandwiched structure comprising the barrier support 220/headband 222, spacer plate 404, third plate 406 and fourth plate 408 may be secured to the first plate 402 using suitable fasteners (e.g., screws, dowels, etc.) passing through the width of the fourth plate 408 and the respective thicknesses of the first through third plates 402-406 and the barrier support 220/headband 222.

The configuration of the first through third plates 402-406, as well as the barrier support 220/headband 222, results in the formation of a slot or gap 412 defined according to the thickness of the spacer plate 404. In a presently preferred embodiment, the width of the spacer plate 404 and, consequently, the slot 412, is 0.05 inches (1.27 mm), which corresponds with a presently preferred 0.02 inch (0.508 mm) thickness of the barrier 302, thereby providing sufficient space needed to allow the barrier 302 to slide freely. Engagement of the first lateral edge 306 of the barrier 304 with the slot 412, along with attachment of the at least one biasing element 330 (via, for example, a knot 332) in the opening 410, is further shown in FIG. 5. As described above, tension in the biasing element 330 induces bias of the lateral edge 306 toward the spacer plate 404 (forming a closed end of the slot 412) and, therefore, continuous engagement of the barrier 302 with the slot 412. Furthermore, provided that the width of the slot 412 relative to the thickness of the barrier 302 does not induce excessive friction with the barrier 302, the barrier 302 will remain free to slide down and up within the slot 412 (i.e., into and out of the plane of FIG. 4) in order to permit adjustability of the barrier 302.

Figure 6:
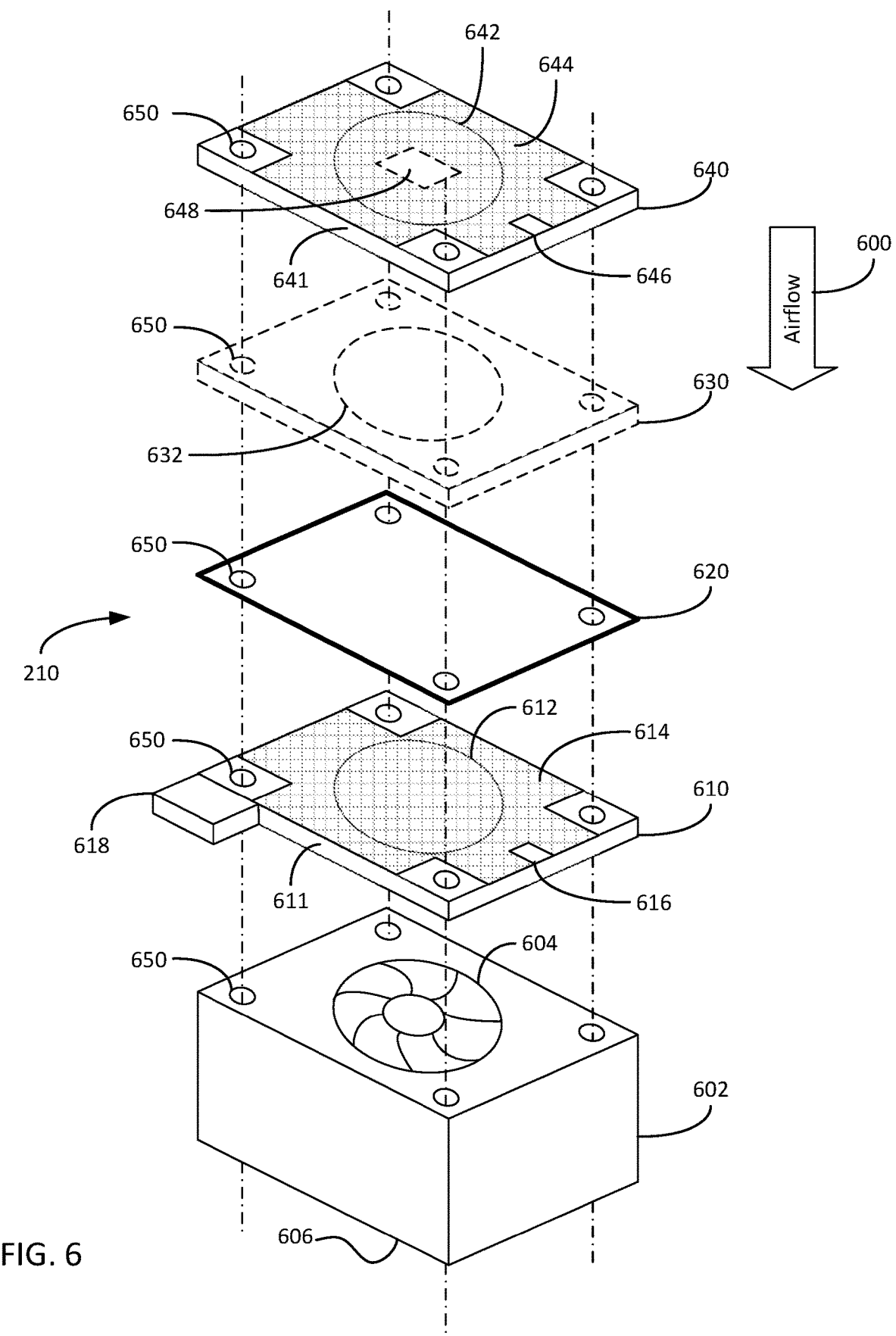
FIG. 6 is a perspective illustration of a disassembled air filtration assembly in accordance with the instant disclosure.
Figure 7:
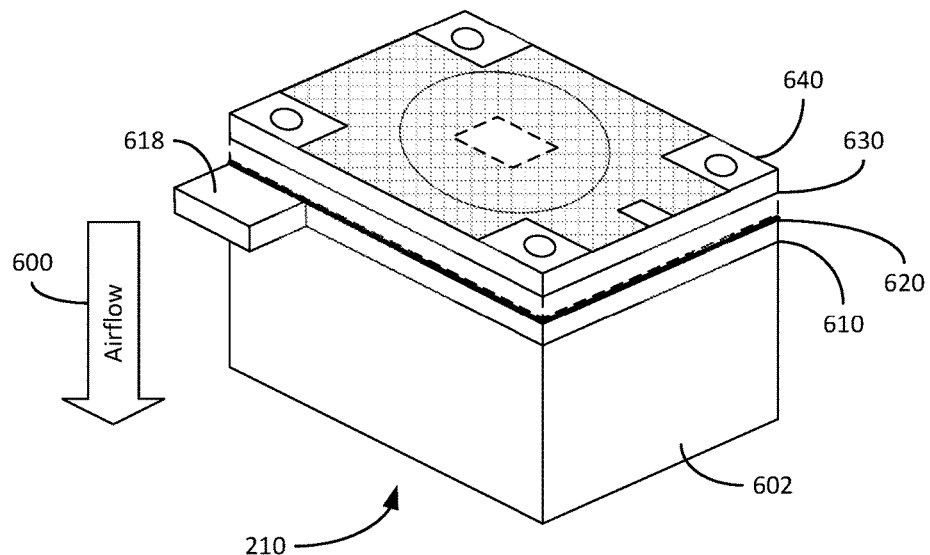
FIG. 7 is a perspective illustration of an assembled air filtration assembly in accordance with the instant disclosure.
Figures 8, 9:
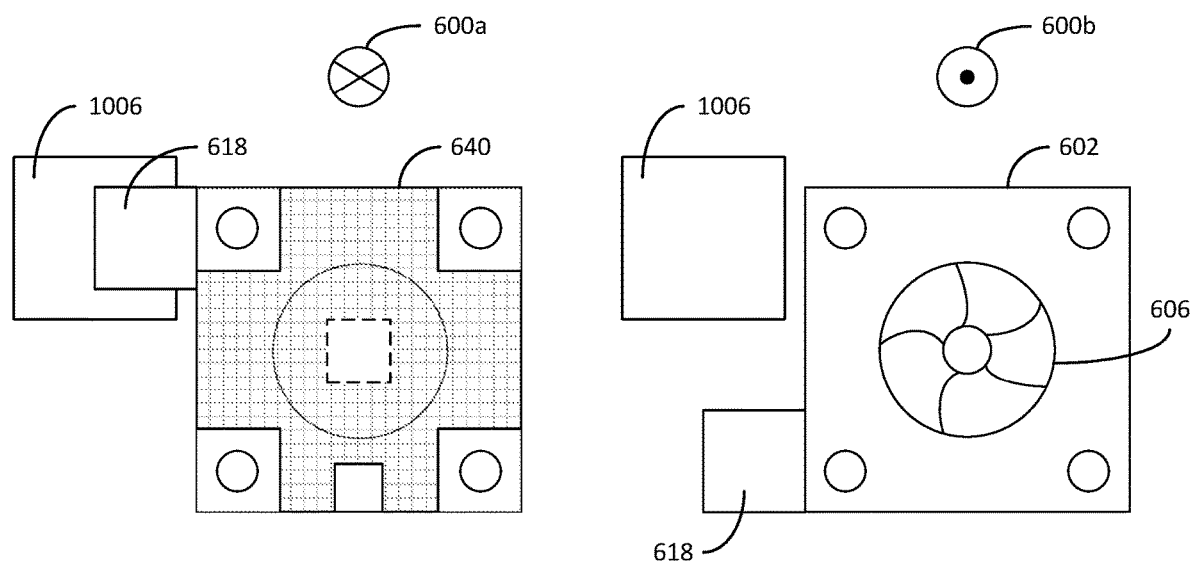
FIGS. 8 and 9 are top-down illustrations of an air filtration assembly in respective first and second configurations in accordance with the instant disclosure.

Referring now to FIG. 6, the air filtration assembly 210 is illustrated in greater detail. In particular, the air filtration assembly 210 comprise a fan 602 having an air inlet 604 and an air outlet 606 (FIG. 9). The fan 602 additionally comprises power inputs (not shown) used to control operation of the fan 602. Arranged as shown in FIG. 6, the fan 602 produces a downward airflow 600 into the air inlet 604 and out the air outlet 606. Preferably, the air outlet 606 is configured to have a diameter at least as large as the opening 108 formed in the visor 102. As shown in FIG. 6, the fan 602 forms the base of a "sandwich" arrangement of layers 610, 620, 630, 640. In particular, an anode layer 610 is disposed over the air inlet 604, a filter layer 620 is disposed over the anode layer 610, an optional sealing layer 630 over filter layer 620 and a cathode layer 640 over the optional sealing layer 630 or filter layer 620. As shown, each of the layers 610, 620, 630, 640 and fan 602 includes two or more alignment holes 650 passing therethrough and configured to have substantially the same pattern and spacings as the mounting holes 114 formed in the visor 102. In this manner, suitable fasteners (e.g., bolts, screws, dowels, etc.; not shown) may be employed to both align the constituent components 602, 610, 620, 630, 640 of the air filtration unit 210 with each other and the opening 108, and to maintain the components 602, 610, 620, 630, 640 in compression and in contact with each other, as best illustrated in FIG. 7.

In a presently preferred embodiment, both the anode and cathode layers 610, 640 comprise a base 611, 641 of electrically-insulating and rigid material, with each base 611, 641 having a hole or opening 612, 642 formed therein configured to be at least as large as the air inlet 604. For example, in a presently preferred embodiment, each base comprise acrylic or other suitable polymer having a thickness of 0.05 inches (1.3 mm). Additionally, both the anode and cathode layers 610, 640 have conductive mesh 614, 644 disposed on an upward (as shown in FIG. 6) facing surface of their respective bases 611, 641 and covering their respective openings 612, 642. In a presently preferred embodiment, the conductive meshes 614, 644 are formed out of uninsulated number 40 mesh copper wire screening capable of filtering out 420 micron particles, chosen because copper is exceptionally conductive, affordable, and known to have antiviral and antimicrobial properties, though it is appreciated that other conductive materials may be employed. In the illustrated embodiment, the conductive meshes 614, 644 are patterned to avoid the areas immediately adjacent each alignment hole 650 in order to avoid any short-circuiting or grounding of the conductive meshes 614, 644 by virtue of the alignment fasteners. Further still, each conductive mesh 614, 644 has an electrode 616, 646 attached thereto and providing an electrically conducive path between the conductive mesh 614, 644 and an electrical biasing source, as described in further detail below.

When biased by respective positive and negative electric potentials, the anode and cathode layers 610, 640 create an electric field traversing the thickness of the filter layer 620. Thus configured, the electric potential of the anode layer 610 will attract any electrostatically negative charged virus, such as the SAR-CoV-2 virus, or other pathogens. Additionally, the presence of the electric field across the filter layer 620 may be effective to maintain the electrostatic charge of the filter layer material and thus maintain the effectiveness of the filter layer to attract charged pathogens.

In an optional embodiment, the conductive mesh 644 of the cathode layer 640 may have an opening 648 formed therein, i.e., a region larger than the mesh openings of the conductive mesh 644 but smaller than the opening 642 formed in the base 641 in which the conductive mesh has been removed. For example, the opening may comprise a 0.5 inch (12.7 mm) square. Thus configured, the opening 648 effectively creates a region of reduced negative electric field such that negatively charged particles are deflected by the comparatively stronger electric field surrounding the opening 648 toward the opening and into the filter layer material beneath the opening 648. In this manner, the filter layer material thus targeted may be tested to determine the presence of any trapped particles.

In a currently preferred embodiment, the filter layer 620 is a 0.04 inch (1.016 mm) thick, N95 polypropylene with an ability to capture 0.3 micron particles. It is preferable that the filter layer 620 be non-woven, effective against the pathogen being filtered, and relatively thin to facilitate efficient airflow 600. In an embodiment, the filter layer 620 entirely covers the conductive mesh 614 of the anode layer 610. The optional sealing layer 630 is preferably fabricated from an elastic (or at least pliable), electrically-insulating material such as a food-grade silicone elastomer or polymer. Additionally, the sealing layer 630 includes an opening 632 substantially similar in dimensions to the openings 612, 642 formed in the anode and cathode layers 610, 640. In a presently preferred embodiment, the sealing layer 630 has a thickness (when also accounting for the thickness of the filter layer 620) such that the anode and cathode layers 610, 640 are separated by a gap of $1/16^{th}$ inches (1.6 mm) when the air filtration assembly 210 is fully assembled. The sealing gasket 116 attached to the upper surface 112 of the visor may be formed of the same material and have a similar thickness to the sealing layer 630, thereby preventing leaks in airflow when either the cathode or the fan is the layer being mounted directly over the opening 108 as described in further detail below.

When fully assembled, the air filtration assembly 210 always provides an airflow 600 in which air is drawn into the assembly 210 through the conductive mesh 644 of the cathode layer 640 (and the optional opening 648 therein) and then successively through the opening 642 in the cathode layer 640, the opening 632 in the optional sealing layer 630, the filter layer 620, the conductive mesh 614 of the anode layer 610, the opening 612 in the anode layer 610, the air intake 604 and, finally, out the air outlet 606. As described in further detail below, the air filtration assembly 210 may be disposed on the visor 102 in two different configurations to achieve alternative modes of operation of the air delivery system 300.

In the illustrated embodiment, the base 611 of the anode layer 610 additionally has a mode actuator 618 formed as a lateral extension thereof. In particular, the mode actuator 618 is configured to align with and thereby actuate a mode switch 1006 when the air filtration assembly 210 is in a first configuration as illustrated in FIG. 8, i.e., with the fan 602 adjacent the visor 102 and the cathode layer 640 facing away from the outer surface 112 of the visor 102. On the other hand, the mode actuator 618 is configured to be unaligned with the mode switch 1006, thereby permitting the mode switch 1006 to be in a default state, when the air filtration assembly 210 is in a second configuration as illustrated in FIG. 9, i.e., with the cathode layer 640 adjacent the visor 102 and air outlet 606 of the fan 602 facing away from the outer surface 112 of the visor 102. In short, selection of the first or second configuration of the air filtration assembly 210 is controlled by flipping the orientation of the air filtration assembly 210 accordingly. By allowing the air filtration assembly 210 to be removably secured to the visor 102, a user is able to readily switch between the two configurations as desired.

As shown in FIG. 8, in the first configuration, the airflow 600a is toward the inner surface 110 of the visor 102 (into the plane of FIG. 8). More specifically, in this first configuration, the air filtration assembly 210 draws air from the environment above the visor 102 and provides filtered air to the region 340 in front of the user's face, thereby reducing potential pathogens that might be inhaled by the user 200. Furthermore, because the region 340 is continuously maintained at a positive pressure relative to the surrounding environment through operation of the air filtration assembly 210 (so long as the fan 602 is powered and operational), filtered air is continuously provided to the user 200 and air outside of the region 340 is prevented from entering the region. Further still, given the positive pressurization of the region 340, the user's exhaled breath is exhausted out of the region 340 by virtue of the continuous downward airflow provided by the air filtration assembly 210 in this first configuration.

Alternatively, and as shown in FIG. 9, in the second configuration, the airflow 600b is away from the outer surface 112 of the visor 102 (out of the plane of FIG. 9). More specifically, in this second configuration, the air filtration assembly 210 draws air from the region 340 in front of the user's face and provides filtered air to the environment above the visor 102, thereby reducing injection of potential pathogens that might be exhaled by the user 200 into the user's environment. Furthermore, because the region 340 is continuously maintained at a negative pressure relative to the surrounding environment through operation of the air filtration assembly 210 (again, so long as the fan 602 is powered and operational), the user's unfiltered, exhaled breath is prevented from exiting the region 340 other than through the air filtration assembly 210.

As will be appreciated, operation of the air delivery system 300 with either the first or second configurations of the air filtration assembly 210 provides different benefits. For example, if the user of the air delivery system 300 is in an environment in which it is uncertain that steps have been taken to mitigate pathogen presence in the environment (e.g., in a public space in the absence of masking requirements), then the user may be motivated to operate the air delivery system 300 in the first configuration such that filtered air is delivered to the user. Inversely, if the user of the air delivery system 300 is in an environment in which steps have been taken to mitigate pathogen presence in the environment (e.g., in a private space in which masking requirements are enforced), then the user may be motivated to operate the air delivery system 300 in the second configuration such that the user's filtered breath is delivered to the surrounding environment. For example, the second configuration may be particularly beneficial in a school or hospital environment where efforts to mitigate pathogen spread are enforced and individuals within such environments are encouraged to prevent potential spread of such pathogens through unknown infections.

Figure 10:
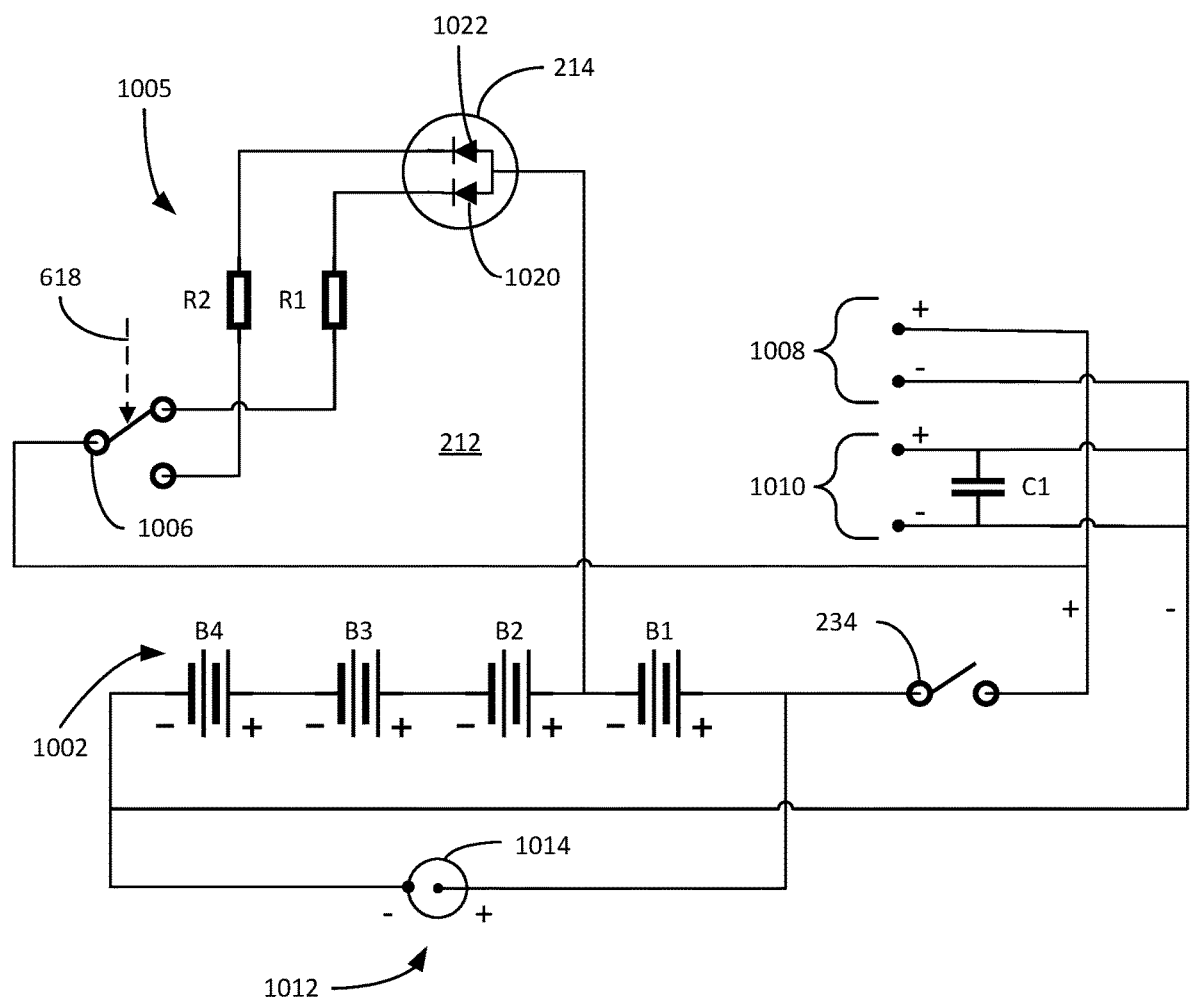
FIG. 10 is a schematic electrical diagram of a power assembly and a filtration mode indicator in accordance with the instant disclosure.

As described in further detail below, the mode switch 1006 provides control of the filtration mode indicator 214 that, in turn, provides an indication to others around the user 200 of the particular configuration of the air delivery system 300 being used. In particular, the mode switch 1006 is configured to be in either a default state or an actuated state. That is, if the mode switch is not specifically actuated, it will be in its default state. For example, in a presently preferred embodiment, the mode switch 1006 is a momentary, single pole-double throw switch (FIG. 10). Thus, as shown in FIGS. 8 and 9, the mode actuator 618 is designed to control the mode switch 1006 into either its default or actuated states depending on configuration of the air filtration assembly 210. More specifically, when the air filtration assembly 210 is in the first configuration, as shown in FIG. 8, the mode actuator 618 aligns with and thereby actuates the mode switch 1006. On the other hand, when the air filtration assembly 210 is flipped over, and thus in the second configuration as shown in FIG. 9, the mode actuator 618 does not align with, and therefore does not actuate, the mode switch 1006, which instead remains in its default state.

Referring now to FIG. 10, a power assembly 212 in accordance with a presently preferred embodiment is schematically illustrated. In particular, the assembly 212 comprises at least one battery 1002 in series with the power switch 234 and operatively connected to supply electrodes 1008 for the fan 602, supply electrodes 1010 for the anode and cathode layers 610, 640 of air filtration assembly 210 and a mode indication circuit 1005 comprising the mode switch 1006 and the filtration mode indicator 214. In a presently preferred embodiment, the batteries 1002 comprise four rechargeable batteries arranged in series as shown, and preferably comprising two 4.8 V batteries and two 1.2 V batteries providing a total of 12 V. In the case of rechargeable batteries, the power assembly 212 further comprises recharging circuitry 1012 as known in the art, including a charging port 1014 in parallel with the batteries 1002 for applying a charging current thereto.

When the power switch 234 is closed, the full 12 V supply is applied to the fan electrodes 1008 and to a series-wired capacitor C1 used to maintain the biasing voltage applied to the anode (positive electrode) and cathode (negative electrode) layers 610, 640. On the other hand, a single battery, preferably 4.8 V, is wired to supply the mode indication circuit 1005. Specifically, the positive terminal of the battery is wired (through the power switch 234) to the pole of the mode switch 1006 and the negative terminal of the battery is wired to the filtration mode indicator 214. In a presently preferred embodiment, the filtration mode indicator 214 is embodied by a visual indicator such as a bicolor light emitting diode (LED) and corresponding biasing resistors R1, R2, as known in the art. For example, the bicolor LED may comprise red and green LEDs. In the configuration shown, the mode switch 1006 is depicted in its default state (corresponding to the second configuration of the air filtration assembly 210), which completes the circuit for a first LED 1020 (e.g., the red LED), thereby causing the first LED 1020 to illuminate. When, as described above, the mode actuator 618 actuates the mode switch 1006 (corresponding to the first configuration of the air filtration assembly 210), the mode switch 1006 instead completes the circuit for the second LED 1022 (e.g., the green LED), thereby causing the second LED 1022 to illuminate. Because the filtration mode indicator 214 (bicolor LED) is mounted on the visor 102, a visual indication is provided to others in proximity to the user 200 concerning how the air delivery system 300 is being operated.

The instant disclosure describes an air delivery system in which an air filtration assembly may be deployed in either of two configurations depending on whether filtered air is to be supplied to a user of the air delivery system or discharged to the surrounding environment. While particular preferred embodiments have been shown and described, it will be obvious to those skilled in the art that changes and modifications may be made without departing from the instant teachings. For example, while various components have been illustrated herein as being mounted on top of (on the outer surface of) the visor, such components could also be mounted on the inner/lower surface of the visor or, with the exception of the air filtration assembly, mounted elsewhere (e.g., the face shield slide assemblies 230, 232) and provided with suitable connections to the related components. On the other hand, any components mounted on the barrier slide assemblies could also be mounted on the visor as space permits. Still further, though the filtration mode indicator has been depicted herein as a particular type of visual indicator, it is appreciated that other types of visual indicators may be used for this purpose.

It is therefore contemplated that any and all modifications, variations or equivalents of the above-described teachings fall within the scope of the basic underlying principles disclosed above and claimed herein.

What is claimed is:

1. An air delivery system comprising:
   a visor having an outer peripheral edge and an inner peripheral edge configured to conform to and be positioned across a forehead of a user;
   an air filtration assembly removably mounted above an opening in the visor between the outer and inner peripheral edges, the air filtration assembly comprising a fan having an air inlet and an air outlet, an anode layer disposed over the air inlet, a filter layer disposed over the anode layer and a cathode layer disposed over the filter layer, wherein air enters the air filtration assembly through the cathode layer and exits the air filtration assembly through the air outlet; and
   a filtration mode indicator supported by the visor;
   wherein the air filtration assembly provides, in a first configuration, air flow toward an inner surface of the visor and provides, in a second configuration, air flow away from an inner surface of the visor toward an outer surface of the visor,
   and wherein the air filtration assembly includes a mode actuator configured to control operation of the filtration mode indicator in dependence upon positioning of the air filtration assembly in the first or second configuration.

2. The system of claim 1, further comprising:
   a barrier positioned along the outer peripheral edge of the visor and extending substantially perpendicular to the visor.

3. The system of claim 2, wherein the barrier is vertically configurable such that a distal edge of the barrier relative to the visor is configured to be extended past a chin of the user or retracted into proximity with the visor.

4. The system of claim 3, further comprising:
   barrier slide assemblies configured to retain the barrier in proximity to the outer peripheral edge of the visor and to permit vertical configuration of the barrier.

5. The system of claim 4, wherein each of the barrier slide assemblies defines a slot configured to receive a lateral edge of the barrier.

6. The system of claim 5, further comprising:
   a barrier support extending along the outer peripheral edge of the visor, where a biasing element biases the barrier into contact with the barrier support and biases the lateral edges of the barrier into the slots of the barrier slide assemblies.

7. The system of claim 2, wherein the barrier is transparent.

8. The system of claim 1, further comprising:
   a headband operatively connected to the visor and configured to fit around the head of the user.

9. The system of claim 1, further comprising:
   a power assembly operatively connected to and electrically biasing the anode layer and the cathode layer.

10. The system of claim 9, wherein the filtration mode indicator comprises a visual indicator operatively connected to the power assembly by a mode switch configured to interact with the mode actuator.

11. The system of claim 10, wherein the mode switch is in an actuated state when the mode actuator interacts with the mode switch in the first configuration.

12. The system of claim 10, wherein the mode switch is in a default state when the mode actuator does not interact with the mode switch in the second configuration.

13. The system of claim 10, wherein the visual indicator is a bicolored LED.

14. The system of claim 9, wherein the power assembly comprises at least one battery.

15. The system of claim 14, wherein the at least one battery is rechargeable, the power assembly further comprising recharging circuitry operatively connected to the at least one battery.

16. The system of claim 1, wherein the anode layer and cathode layer each comprise a conductive mesh sized to cover the air inlet.

17. The system of claim 16, wherein the cathode layer comprise an opening in the conductive mesh larger than mesh openings of the conductive mesh and smaller than the air inlet.

18. The system of claim 1, wherein the filter layer comprises an electrostatic non-woven polypropylene fiber material.

19. The system of claim 1, wherein the air filtration assembly further comprises a sealing layer between the filter layer and the cathode layer.

20. The system of claim 19, wherein the sealing layer is configured to provide a distance of approximately $1/16^{th}$ of an inch (1.6 mm) between the anode and cathode layers.

* * * * *